C. CROFUT.
Weeding Implement.
No. 166,506. Patented Aug. 10, 1875.
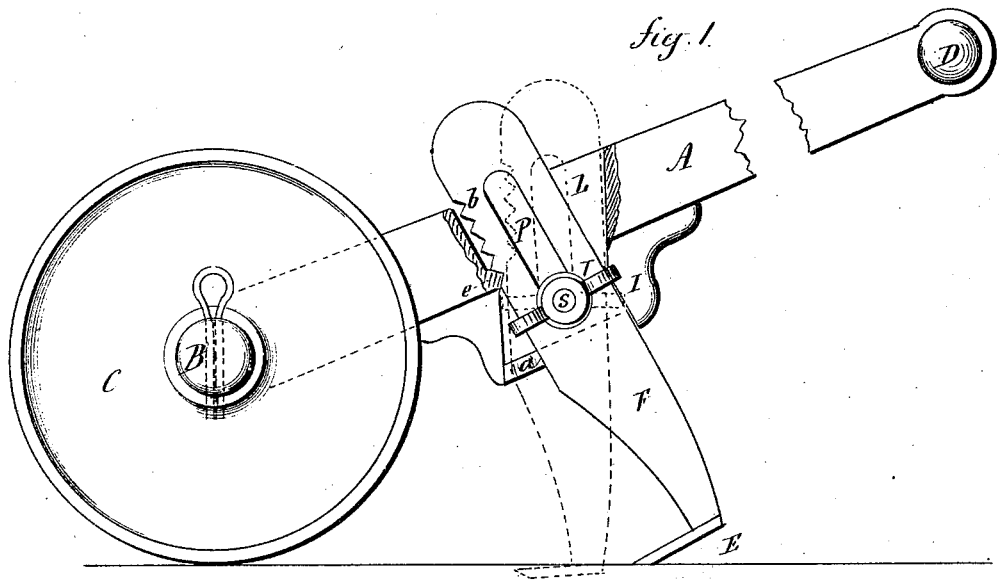
Fig. 1
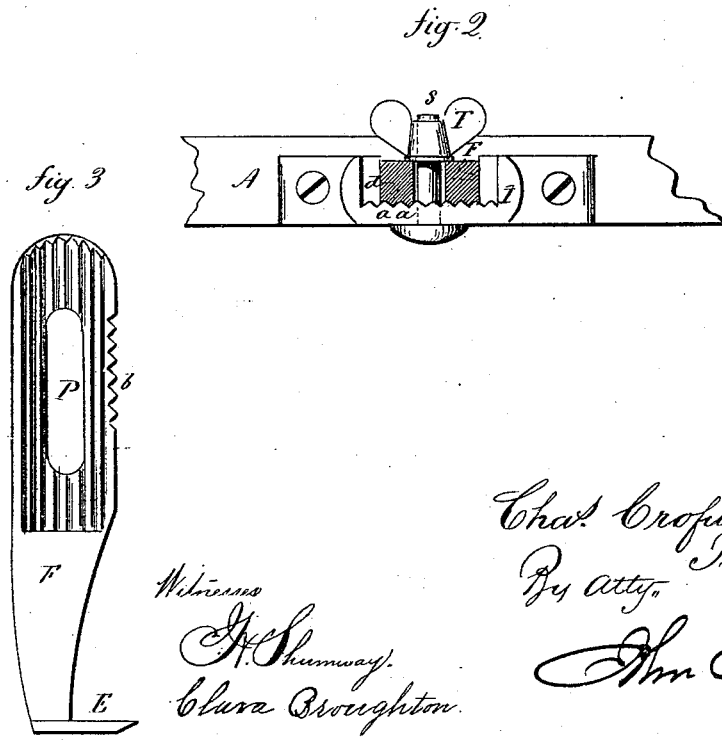
Fig. 2
Fig. 3
Witnesses
H. Shumway
Clara Broughton
Chas. Crofut
Inventor
By Atty.
John S. Earle

UNITED STATES PATENT OFFICE.

CHARLES CROFUT, OF WESTON, CONNECTICUT, ASSIGNOR OF ONE-HALF HIS RIGHT TO MATTHEW BUCKLEY AND WILLIAM H. CROFUT, OF SAME PLACE.

IMPROVEMENT IN WEEDING IMPLEMENTS.

Specification forming part of Letters Patent No. 166,506, dated August 10, 1875; application filed May 11, 1875.

*To all whom it may concern:*

Be it known that I, CHARLES CROFUT, of Weston, in the county of Fairfield and State of Connecticut, have invented a new Weeding Implement; and I do hereby declare the following, when taken in connection with the accompanying drawings and the letters of reference marked thereon, to be a full, clear, and exact description of the same, and which said drawings constitute part of this specification, and represent, in—

Figure 1, sectional side view; Fig. 2, an under-side view of the socket and a portion of the beam; Fig. 3, inside view of the shank.

This invention relates to an improvement in machines for destroying or removing weeds from gardens, and especially to that class in which a blade is run along beneath, but near the surface of, the earth, so as to cut the roots, and at the same time lighten the soil.

The object of the invention is to make the blade adjustable to different elevations and angles; and it consists in constructing the blade, shank, and its socket with corrugated meeting surfaces, and transverse notches on the edge, combined with a clamping-screw, as more fully hereinafter described.

A is the beam, supported upon an axle, B, provided with one or more wheels, C, the beam provided with a handle, D, for convenience of driving the weeding-blade E, which consists of a thin plate of any convenient length and shape of edge. It is attached to, or formed upon, the lower end of a shank, F, which extends up through a socket, I, on the beam. This socket forms a continuation of a mortise, L, in the beam. On one side of the socket, at the lower edge, is a succession of notches or corrugations, $a$, and that side of the shank is constructed with vertical grooves $d$ to correspond to the said notches $a$. The length of the mortise in the socket is greater than the width of the shank F. The forward edge of the shank is constructed with transverse notches $b$, and in the socket is a projection, $e$, to fit either of the notches $b$. The shank is constructed with a vertical slot, P, and through this and the socket a bolt, S, extends, provided with a thumb-nut, T, to bind the shank in place.

As represented in Fig. 1, the blade is set at its greatest incline, and so that the beam is at its lowest point. Supposing it to be desirable to change the relative position of the blade: Loose the nut, so as to allow the shank to be moved from the notches, and turn it forward to the desired position, (represented in broken lines in its most forward position,) the projection $e$ always remaining in one of the notches $b$ in the shank. For different elevations the shank will be set so as to bring a different notch $b$ upon the projection $e$.

By this construction different elevations and different angles are easily obtained to accommodate different depths of cut, or different heights of persons using the machine.

I do not, broadly, claim an adjustable blade for weeding-machines, as such, I am aware, is not new.

I claim—

In a weeding-machine, the combination of the shank F, constructed with vertical grooves $d$ and transverse notches $b$, and the slot B, the notches $a$, and projections $e$ in the socket, and the clamping-bolt, substantially as set forth.

CHAS. CROFUT.

Witnesses:
DAVID S. GRAY,
M. W. SALMON.